3,257,275
CHITOSAN CONTAINING ANTACID COMPOSITION AND METHOD OF USING SAME
Mark Weisberg, Providence, R.I., and Richard S. Gubner, Port Washington, N.Y., assignors to Mark Weisberg, Providence, R.I., and Richard S. Gubner and Harry Kroll, Edgewood, R.I.
No Drawing. Filed Feb. 7, 1962, Ser. No. 171,583
18 Claims. (Cl. 167—55)

This invention concerns a pharmaceutical antacid preparation useful for alleviating gastric hyperacidity and conditions caused by it, such as peptic ulcer and is a continuation-in-part of our application Serial No. 642,648 filed February 27, 1957, now abandoned.

Specifically the invention is that of such a pharmaceutical preparation effective for alleviating gastric hyperacidity and peptic ulcer, and in a pharmaceutical dosage form containing chitosan (i.e., deacetylated chitin) in an effective antacid dosage quantity range as the major pharmaceutical ingredient by weight.

More particularly the invention embraces such a preparation in a solid dosage form containing chitosan as its major pharmaceutical constituent by weight and within an effective antacid dosage range. The chitosan also can be accompanied with one or more other substances serving to enhance its effective utility, and/or one or more constituents that cooperate with it or contribute additional useful effects.

Also part of the invention is the method of combating as well as alleviating gastric hyperacidity and conditions caused by it, such as peptic ulcer, by administering orally to a subject prone to or suffering the distress of hyperacidity or a condition caused by it, such as peptic ulcer, a pharmaceutical preparation containing chitosan in a dosage form for oral administration and in an antacid dosage quantity effective to combat as well as alleviate such distress, and thereby subjecting the gastric mucosa at least in the stomach and duodenal bulb and their secretions to contact with the chitosan from said preparation.

A primary factor in gastric distress is the hypersecretion of hydrochloric acid in the stomach. This increased acid secretion plus the presence of gastric pepsin are considered the causative agents in the ulceration of the gastric and intestinal mucosa. Normally, the mucosal tissues of the stomach and duodenal bulb are protected by a film of mucin, the mucopolysaccharide secreted by the gastric mucosa.

Aside from the use of certain spasmolytic drugs, the major therapeutic agents used in gastric distress due to hyperacidity, as well as for the prevention and healing of peptic ulcers, have been inorganic alkalizing agents. There has also been a limited use of hard gastric mucin and of synthetic polymers capable of binding or neutralizing hydrochloric acid.

The rationalization of an alkali regimen for treating peptic ulcers is to neutralize the primary causative agent, namely the hydrochloric acid secreted by the stomach. Pepsin is known to lose its proteolytic activity at a pH above 3.5. Thus, decreasing the acidity of the stomach contents to above pH 3.5 produces two beneficial results, viz., (1) neutralization of the irritating stomach acid, and (2) inhibition of the tissue eroding properties of gastric pepsin.

Despite this simple interpretation of the treatment of hyperacidity and peptic ulcers, the oral intake of alkalis by patients has obvious drawbacks. The most commonly used antacid is sodium bicarbonate. This, while effective in relieving gastric acidity, is short-acting and produces a subsequent undesirable acid rebound; and in addition may lead to systemic alkalosis when used over extended period of time, which can result in precipitation of kidney stones and other untoward effects.

Among the non-systemic alkalizing agents which are commonly used as antacids are, for the most part, colloidal aluminum hydroxide or aluminum phosphate gels. Basic oxides or salts of aluminum or magnesium are used in tablet form. The gels of these substances provide symptomatic relief from gastric distress due to hyperacidity, and cover the gastric mucin with a mildly alkaline demulcent film which protects the irritated mucosa.

However, for satisfactory gastric relief, the patient must indulge daily in frequent oral intake of relatively large amounts of aluminum preparations which may produce mild to severe constipation and fecal impaction.

To overcome the inconveniences in use of the aluminum gel preparations, tablets of aluminum hydroxide, magnesium trisilicate, and other non-systemic types of alkalizing agents have been offered as antacids. While these tablets are convenient for daily oral administration, they neutralize gastric acids more slowly than the gels and do not form a demulcent film on the gastric mucosa. In addition, these agents have a brief antacid effect, because hypermotility of the stomach accompanies hyperacidity and peptic ulcer and consequently the stomach contents containing these antacid agents are expelled into the small intestine.

Not so many years ago, use of anion exchange resins was advocated for hyperacidity. Although satisfactory relief has been reported, these resins have not received wide public acceptance, because these resins lack palatability and also are devoid of demulcent properties.

Sodium carboxymethylcellulose has been used as a nonsystemic antacid. However, its use has been confined to dilute solutions because the anhydrous material tends to gel when in contact with moisture. This made swallowing of tablets of it extremely difficult or even dangerous because the swelling tablet often would adhere to the esophagus and produce obstructions which required surgical removal.

These various shortcomings, undesirable properties and disadvantages in these formerly provided antacids and preparations for treating peptic ulcer are avoided by the compositions of matter and method of this invention.

Considered generally, this invention consists of two particular aspects, namely, (a) antacid preparations comprising chitosan as the major pharmaceutically effective agent by weight and the essential and principal substance contributing antacid effect, and (b) the method of alleviating and combatting gastric hyperacidity and conditions caused by it such as peptic ulcer, by administering an antacid effective dosage of such chitosan-containing compositions.

Chitosan is obtained by deactylation of naturally occurring chitin, for example, as described in U.S. Patent 2,040,879. Chitosan is a tasteless polyglucosamine which (as the free base) is insoluble in water and dissolves in mineral acids and dilute acetic acid to give viscous dispersions or solutions.

In its product form, the invention provides a pharmaceutical preparation effective for alleviating and combatting gastric hyperacidity and conditions caused by it such as peptic ulcer, which preparation is in a pharmaceutical unit dosage form containing per dosage unit from about one-half gram to about four grams of chitosan together with a pharmaceutically suitable carrier. Such preparation is particularly effective in such dosage units in solid dosage forms.

In such dosage form of the preparation, the chitosan can be accompanied with a substance or substances to enhance its utility. Instead or also, it can be admixed with one or more constituents to cooperate with it in contributing additional useful effects.

These preparations in solid dosage forms include the solid pharmaceutical dosage forms, such as tablets, pastilles, lozenges, capsules, or as pharmaceutical wafers or powder packets, and other applicable solid pharmaceutical dosage form for oral administration.

The solid dosage forms of these preparations comprising chitosan include also so-called bakers' baked product forms, for example, cookies, cake wafers, crackers, cup cakes, and the like, as well as various bread forms. All such bakers' baked product forms of the invention can be referred to more specifically as the baked products, or a baked product, dosage form.

The products thus embraced by the invention include the solid chitosan admixed in effectively finely divided state with finely divided solid carriers, diluents, and in a pharmaceutical dosage unit form, with any compatible diluent, incipient and/or binder tableting materials used in pharmaceuticals, such as lactose, cornstarch, talc, sugar, gelatin and other suitable gums, and the like, or a lubricant such as magnesium stearate, or some other.

With any such tableting materials, and especially for a pharmaceutical solid dosage form, the chitosan can be admixed with a pharmaceutically acceptable non-systemic alkalizing agent such as such an alkalizing agent containing a combined alkaline earth metal (including magnesium as such), for example, an alkaline earth carbonate or oxide as calcium carbonate or magnesium carbonate, or magnesium oxide, or magnesium trisilicate; or such an alkalizing agent containing bismuth as a combined metal, as bismuth subcarbonate or bismuth sub-nitrate, or such an alkalizing agent containing a pharmaceutically acceptable dihydroxy-aluminum salt of an amino lower-alkanoic acid (e.g. having under six carbons), such as dihydroxy-aluminum glycinate, or other like non-systemic alkalizing agents containing a combined metal.

A compatible, orally effective anticholinergic spasmolytic agent such as methantheline bromide, atropine sulfate, diphenylacetyldiethylaminoethanol hydrochloride, and others also can be included.

Any of such non-systemic alkalizing agents, or spasmolytic agents, when included, usually is taken in a minor percentage of the weight of chitosan in the composition, and generally as a small percentage of it. For example, the non-systemic alkalizing agent can be included at from about two percent to about thirty percent, or even up to about forty-eight percent of the chitosan; and the spasmolytic agent can be from about one-tenth percent to about ten percent of it.

The chitosan advantageously is finely divided preferably to from about fifty to about one hundred mesh, and even about two hundred mesh or smaller, although it can be as large as about twenty mesh, and this general overall size range is intended by designating the chitosan as "finely divided." This chitosan material may be tableted with any of the indicated diluents, incipients, or adjuvants. Alternatively, this chitosan and any such accompanying materials can be admixed and encapsulated in capsules which are rapidly or at least readily frangible in the stomach, such as starch capsules.

The hyperacidity and also peptic ulcer patient must take over a protracted period several doses daily, usually at least four, of even an antacid preparation embraced by this invention. The herein embraced chitosan antacid preparations then should be free at least of cathartic or laxative or peristalsis-provoking amounts of any cathartic, laxative, peristalsis-provoking, or purgative constituents; and generally should not contain any of them.

The pharmaceutical preparations of the invention, especially in solid pharmaceutical dosage form, are illustrated by, but not restricted to, the following examples for that dosage form, such as tablets, capsules, pastilles or lozenges, and containing the respectively recited relative amounts of effective ingredients:

*Example 1*

| | Parts |
|---|---|
| Chitosan | 1000 |
| Magnesium oxide | 50 |

*Example 2*

| | |
|---|---|
| Chitosan | 1000 |
| Magnesium trisilicate | 50 |

*Example 3*

| | |
|---|---|
| Chitosan | 1000 |
| Magnesium carbonate | 50 |

*Example 4*

| | |
|---|---|
| Chitosan | 1000 |
| Calcium carbonate | 50 |

*Example 5*

| | |
|---|---|
| Chitosan | 1000 |
| Magnesium oxide | 50 |
| Lactose | 150 |
| Magnesium stearate | 10 |

This composition manifests a very rapid acid neutralizing effect as seen, for example, by its neutralizing hydrochloric acid substantially instantaneously.

*Example 6*

| | Parts |
|---|---|
| Chitosan | 1000 |
| Bismuth subcarbonate | 480 |

The bismuth subcarbonate can be replaced as a whole or in part by bismuth subnitrate.

*Example 7*

| | Parts |
|---|---|
| Chitosan | 1200 |
| Dihydroxy aluminum glycinate | 250 |

The dihydroxy aluminum glycinate can be replaced as a whole or in part by any other pharmaceutically acceptable dihydroxy-aluminum salt of an amino lower-alkanoic acid suitable as an alkalizing agent.

In any of these foregoing examples, the tablets or other dosage forms are prepared in known manner. Their chitosan content is included in an amount such that a suitably effective single dosage is available from an individual unit of the particular dosage form. Thus, it is generally advantageous to use at least one-half gram of chitosan per unit of the particular dosage form. Such individual unit of the particular solid dosage form then can serve as an effective minimum dose. In many cases, a higher initial dose can be used and may be indicated.

In any of these various examples, the proportion of its non-systemic antacid to the chitosan can be varied within the range for such antacid disclosed above. So also, in any of these individual examples, the non-systemic alkalizing agent need not be confined to the specific one respectively included. Any of them can be replaced by any of the others or can be used together with some suitable amount of any of the others, so that in the latter case the total quantity of non-systemic alkalizing agents still falls within the weight range disclosed earlier above in relation to the chitosan.

While the composition of Example 5 is more desirable for tablets, the composition of any of these separate examples can be put up in any of the various solid dosage forms, each of which, including also powder packets, broadly can be considered as a preparation comprising an antacid effective dosage of chitosan and a pharmaceutically acceptable non-systemic antacid.

Chitosan has a far more rapid acid neutralizing action than other heretofore available inorganic non-systemic antacids. The higher the chitosan content of any individual dosage form unit, the greater is the amount of acid it will neutralize following its administration. Thus, more than one-half gram per dosage form unit can be used, for example, six-tenths or two-thirds of a gram, or even three-quarters of a gram for tablets or capsules.

Any solid dosage form of a gram or more can be prepared slotted to enable breaking into gram or half gram portions. The powder packets can contain a single dosage of as much as two or three or even four grams. Such amounts are administered advantageously by being stirred into water or milk or other drinking liquid.

The peptic ulcers caused by gastric hyperacidity occur in the pyloric portion of the stomach and in the first or early portion of the duodenum (i.e., the duodenum bulb).

The indications are that the preparations and method of this invention serve to combat and alleviate the hyperacidity and such accompanying peptic ulcers, by virtue of the development that the included chitosan provides a viscous lining material which spreads out to extend as a very beneficial demulcent coating over the gastric mucosa of the ulcerated portion of the stomach, e.g., of its pylorus, and of the duodenal bulb. The result is an effectively early and prolonged relief of the distress from the hyperacidity and accompanying peptic ulcerous condition.

The foregoing examples illustrate the products of the invention in the solid pharmaceutical dosage form. The antacid preparations of the invention are advantageously effective in the baked product dosage form. The various examples of the bakers' or baked product dosage form of antacid composition of the invention can include the chitosan to the extent of from about twenty to about seventy-five percent of the total solid content.

Accordingly, the required amount of finely divided chitosan is admixed uniformly with the selected flour in accordance with whether cookies, cake wafers, crackers, and the like, or a bread is to be prepared. That mixture then is used in the regular way with the correspondingly required flavoring and seasoning agents and yeast and water to prepare the selected bakers' product type of dosage form of antacid composition of the invention. This form of the invention is illustrated usefully by, but not restricted to, the following examples:

*Example 8*

Two hundred parts of chitosan (200 mesh) and 800 parts of cracker flour and two and one-half parts of salt are intimately mixed together with a suitable amount of yeast and enough water to provide a satisfactory cracker dough, from which crackers are prepared in the usual manner.

*Example 9*

A cookie is prepared in customary manner from a suitable cookie mix containing two hundred and twenty-five parts of chitosan (200 mesh) intimately admixed with seven hundred and twenty-five parts of a satisfactory cookie flour.

Examples 8 and 9 can be repeated by replacing the flour used in them by their respective weights of a satisfactory cake wafer flour mix to provide correspondingly similar cake wafers. Any of those two examples, as well as either of them followed with cake wafer flour to make a cake wafer, can be repeated with respectively different amounts of chitosan to prepare other crackers, cookies, or cake wafers containing different proportions of chitosan to the extent of from about twenty to even seventy-five percent respectively of their total solids content, by the customary steps for making such bakers' products.

The individual crackers, cookies, or cake wafers are prepared to contain a minimum of about one-half gram of chitosan per unit, and preferably one gram to one and one-half grams of chitosan per cracker, cookie, or cake wafer. If desired, these can be prepared with even two, three or up to four grams of chitosan per unit.

However, these higher contents of chitosan per unit are more suitable for a bakers' product dosage form such as a cup cake, or roll, or various forms of bread (e.g., per slice). These others can be prepared by the respectively usual steps including admixing the desired amount of chitosan with the required flour. Although in these items, the smaller content of one-half gram, or preferably one gram to one and one-half grams per unit, also can be used.

Whatever specific type of baked product dosage form is prepared, the chitosan content more generally can be from about one-third to about one-half, and more often preferably about forty-five percent of the total solids content.

Any of the bakers' product dosage forms of the antacid preparations also can contain along with the chitosan one or more of the hereinabove mentioned non-systemic alkalizing agents within the range of proportion to the chitosan as recited above ahead of the specific examples.

In such case, the total of the chitosan and alkalizing agent, and/or anticholinergic spasmolytic agent referred to in the next succeeding paragraph should not exceed seventy-five percent of the total solids of the specific bakers' product; and generally can be from about one-third to one-half, and more often preferably about forty-five percent, of the total solids.

Any of either of the two types of dosage forms of the pharmaceutical preparations of the invention can contain a compatible orally effective anticholinergic spasmolytic agent, such as any of those referred to earlier above, and to the extent of from about one-tenth to about ten percent of the chitosan. Each of the specific examples above is to be considered as if it is repeated herein respectively in full with any one or more of these hereinabove specifically named spasmolytic agents included in it in any ratio to the chitosan within this just recited range.

The pharmaceutical preparations of the invention make available the ideal in an antacid. This is so because not only does their inclusion of chitosan provide a palatable preparation with which no discomfort or distress is experienced in its oral administration, but also it neutralizes gastric hydrochloric acid unusually rapidly and maintains the pH of the stomach content at above 3.5; and especially in addition it develops a beneficial demulcent film over the gastric mucosa, under both neutral as well as acid conditions. This demulcent film is particularly important in providing relief to patients with gastric ulcers because otherwise ordinarily the hypermotility of the stomach common with them empties the gastric contents rapidly.

These chitosan compositions are non-toxic, non-absorbable from the intestines as to their chitosan content at least, and do not interfere with the normal acid-base balance or mineral metabolism of the body, or produce constipation or diarrhea.

The demulcent film formation especially serves also to prolong the period of neutralization. That is particularly beneficial to the gastric ulcer patient especially at night because it delays significantly the onset of the pain and thereby extends markedly the period between administrations of antacid for relief.

It is seen that none of the above-mentioned specific examples of each of the two types of solid dosage forms of the invention is said to have any type of coating to prevent action of the gastric juices in the stomach and duodenum on the chitosen content of the preparation. Thus, the solid carrier of any form of the preparations of the invention is one which enables and allows the gastric juices of the stomach and the duodenum, and at least of the pylorus and the duodenal bulb, to reach and contact the chitosan contained in the preparation.

The method of the invention involves combatting as well as alleviating gastric hyperacidity and conditions caused by it, such as peptic ulcer, in a subject prone to or having hyperacidity and/or peptic ulcer, by administering orally to be swallowed by such subject a solid unit dosage form of a pharmaceutical preparation containing in a solid pharmaceutically acceptable carrier finely divided chitosan to the extent of at least about one-half gram in the single dosage unit; the carrier being one which enables and allows the gastric juices of at least the pylorus and the duodenal bulb to come in contact with the chitosan.

The chitosan thus is allowed to be contacted by the acidic gastric juices at least in the pylorus and the duodenal bulb, whereby they produce a viscous liquid which forms a demulcent film over the sensitive areas thereof, which manifest the hyperacidity distress, as well as areas which have any peptic ulcer, and for a time sufficient for relief to be had from that distress.

The dosage unit administered is not restricted to containing merely one-half gram of chitosan. It can contain more of it, and preferably about a gram to about a gram and one-half. The relief from the distress ordinarily can persist for at least about a couple of hours, usually for a few, and often for several hours, depending on the severity of the hyperacidity and the amount of chitosan in the dosage unit administered.

Any single dosage unit administered of any of both types of the solid dosage form of the preparations of the invention can contain still more chitosan, such as about two, three, and even as much as about four grams of it. After the relief provided by the administration of a particular dosage unit has run out so that distress of the hyperacidity recurs, another dosage unit can be administered. Such regimen can be repeated until no further distress occurs.

The method of the invention can be conducted by administering any of the types of solid dosage forms containing any suitable amounts of any of the non-systemic alkalizing agents and/or of any of the anticholinergic spasmolytic agents mentioned above, and with their respectively mentioned range of proportions to the chitosan.

Each of the specific Examples 8 and 9 and the above-mentioned variations of it to produce any of the other possible bakers' product dosage forms is to be considered as if it is repeated herein respectively in full separately for each of the various other mentioned and possible bakers' product dosage forms and for the various different possible content amounts of chitosan and also of chitosan admixed with the various different possible amounts of the various above-mentioned and described non-systemic alkalizing agents.

For the bakers' products which generally are sliced to be eaten, the individual single dosage unit is considered to be an average slice. In the various forms of the bakers' product wherein a non-systemic alkalizing agent is included with the chitosan, the total weight of both of them should be under seventy-five percent of the total solids content. In any of the bakers' product forms, the quantity of flour in any event should be sufficient for the finished baked product significantly to withstand crumbling until it is to be taken for use.

In any of each of the two major types of solid dosage forms herein, i.e., the pharmaceutical dosage form and the bakers' product dosage form, the chitosan is an essential ingredient for combatting and alleviating the distress of hyperacidity and of any peptic ulcers caused by it. The chitosan is the major pharmaceutically active agent by weight.

What is claimed is:

1. A pharmaceutical preparation for oral administration for the relief of gastric hyperacidity comprising finely divided chitosan and a non-systemic pharmaceutically acceptable alkalizing agent; said chitosan and alkalizing agent being incorporated in a pharmaceutically acceptable solid carrier which will allow gastric juices of the pylorus and the duodenal bulb to contact the chitosan and alkalizing agent after reaching the stomach; the chitosan being present in the order of about one-half gram to about four grams per dosage, and said non-systemic alkalizing agent being present to the extent of less than half the weight of the chitosan.

2. A pharmaceutical preparation as claimed in claim 1, wherein said non-systemic alkalizing agent includes as one of its elements a metal member of the class consisting of aluminum, bismuth, calcium and magnesium.

3. A pharmaceutical preparation as claimed in claim 1, wherein said non-systemic alkalizing agent is a dihydroxy-aluminum salt of an amino lower-alkanoic acid.

4. A pharmaceutical preparation as claimed in claim 3, wherein the dihydroxy-aluminum salt is dihydroxy-aluminum glycinate.

5. A pharmaceutical preparation as claimed in claim 1, wherein the non-systemic alkalizing agent is inorganic.

6. A pharmaceutical preparation as claimed in claim 5, wherein said inorganic alkalizing agent is a member of the class consisting of bismuth subnitrate, bismuth subcarbonate, calcium carbonate, magnesium carbonate, magnesium oxide, and magnesium trisilicate.

7. A pharmaceutical preparation as claimed in claim 6, wherein said non-systemic alkalizing agent is magnesium oxide.

8. A pharmaceutical preparation as claimed in claim 1, wherein said preparation is in solid pharmaceutical dosage unit form.

9. A pharmaceutical preparation for the relief of gastric hyperacidity formed in solid dosage unit form for oral administration, comprising finely divided chitosan and a compatible orally effective anticholinergic spasmolytic agent; said chitosan and anticholinergic spasmolytic agent being incorporated in a pharmaceutically acceptable solid carrier which will allow gastric juices of the pylorus and the duodenal bulb to contact the chitosan and anticholinergic spasmolytic agent after the dosage unit has reached the stomach; the chitosan being present in the order of about one-half gram to about four grams thereof per unit dosage, and said anticholinergic spasmolytic agent being present to the extent of from about one-tenth to about ten percent of the weight of the chitosan.

10. A pharmaceutical preparation as claimed in claim 9, wherein the spasmolytic agent is a member of the class consisting of methantheline bromide, atropine sulfate, and diphenylacetyldiethylaminoethanol hydrochloride.

11. A pharmaceutical preparation for the relief of gastric hyperacidity formed in a baked product dosage form comprising finely divided chitosan incorporated in a comestible baked product so as to allow gastric juices of the pylorus and the duodenal bulb to contact the chitosan after the product has been chewed and reached the stomach; said product having the chitosan present in proportion (a) sufficient for the individual baked product unit dosage to contain in the order of about one-half gram to about four grams of chitosan per dosage unit to provide relief from such distress after sufficient time therefor following intermingling of gastric juices therewith, and (b) in an amount from about twenty percent up to about seventy-five percent of the total solids content of the whole baked product; and with the proportion of the flour being sufficient for said baked product significantly to withstand crumbling substantially until needed to be used.

12. A pharmaceutical preparation as claimed in claim 11, which also contains a non-systemic pharmaceutically acceptable alkalizing agent, the chitosan and said non-systemic alkalizing agent being present jointly in a quantity sufficient to provide relief from the gastric hyperacidity distress; and said non-systemic agent being under half the weight of the chitosan.

13. A pharmaceutical preparation in baked product form as claimed in claim 11, wherein the chitosan content per individual baked product dosage unit is from about one gram to about one and one-half grams.

14. The method of combating as well as alleviating the distress of gastric hyperacidity in a subject experiencing the distress associated therewith, which method comprises administering orally to such a subject a dosage unit of an antacid pharmaceutical preparation prepared in solid dosage unit form and comprising in a solid pharmaceutically acceptable solid carrier finely divided chitosan, as an essential ingredient for alleviating said distress, to the extent of from about one-half gram to about four grams per dosage unit and less than about seventy-five percent of the solids content of said preparation, to be swallowed by such subject, to allow gastric juices of the pylorus and the duodenal bulb to contact said chitosan after it has reached the stomach, thereby to produce with said chitosan a viscous liquid which forms a demulcent film over said distress-causing areas, and allowing said condition to continue for a time sufficient for relief from said distress to occur; and repeating oral administration of such dosage unit of this antacid preparation similarly when such distress again appears.

15. The method as claimed in claim 14, wherein said antacid preparation is in a baked product dosage form and the chitosan is dispersed in baked flour; and the quantity of flour is at least sufficient for said dosage form to withstand crumbling substantially until needed to be used.

16. The method as claimed in claim 15, wherein said preparation contains also a non-systemic alkalizing agent admixed with the chitosan dispersed in the baked flour, and to the extent of less than half of the weight of the chitosan.

17. The method as claimed in claim 16, wherein said non-systemic alkalizing agent includes as one of its elements a metal member of the class consisting of aluminum, bismuth, calcium, and magnesium.

18. The method as claimed in claim 17, wherein said alkalizing agent is a member of the class consisting of bismuth subnitrate, bismuth subcarbonate, calcium carbonate, magnesium carbonate, magnesium oxide, and magnesium trisilicate.

References Cited by the Examiner

UNITED STATES PATENTS

| 2,239,543 | 5/1941 | Andrews | 167—82.7 X |
| 2,795,579 | 6/1957 | Doczi | 260—211 |
| 2,842,049 | 7/1958 | Delangre | 260—211 |

FOREIGN PATENTS 125,988 9/1949. Switzerland.

OTHER REFERENCES

Howard, Modern Drug Encyclopedia, 5th Edition, 1952, Drug Publications, New York, N.Y., pages 106 and 158.

JULIAN S. LEVITT, *Primary Examiner.*

MORRIS O. WOLK, LEWIS GOTTS, *Examiners.*